April 29, 1930.  P. G. FRESHWATER ET AL  1,756,287
WOOD SAWING MACHINE
Filed Sept. 24, 1928    3 Sheets-Sheet 1
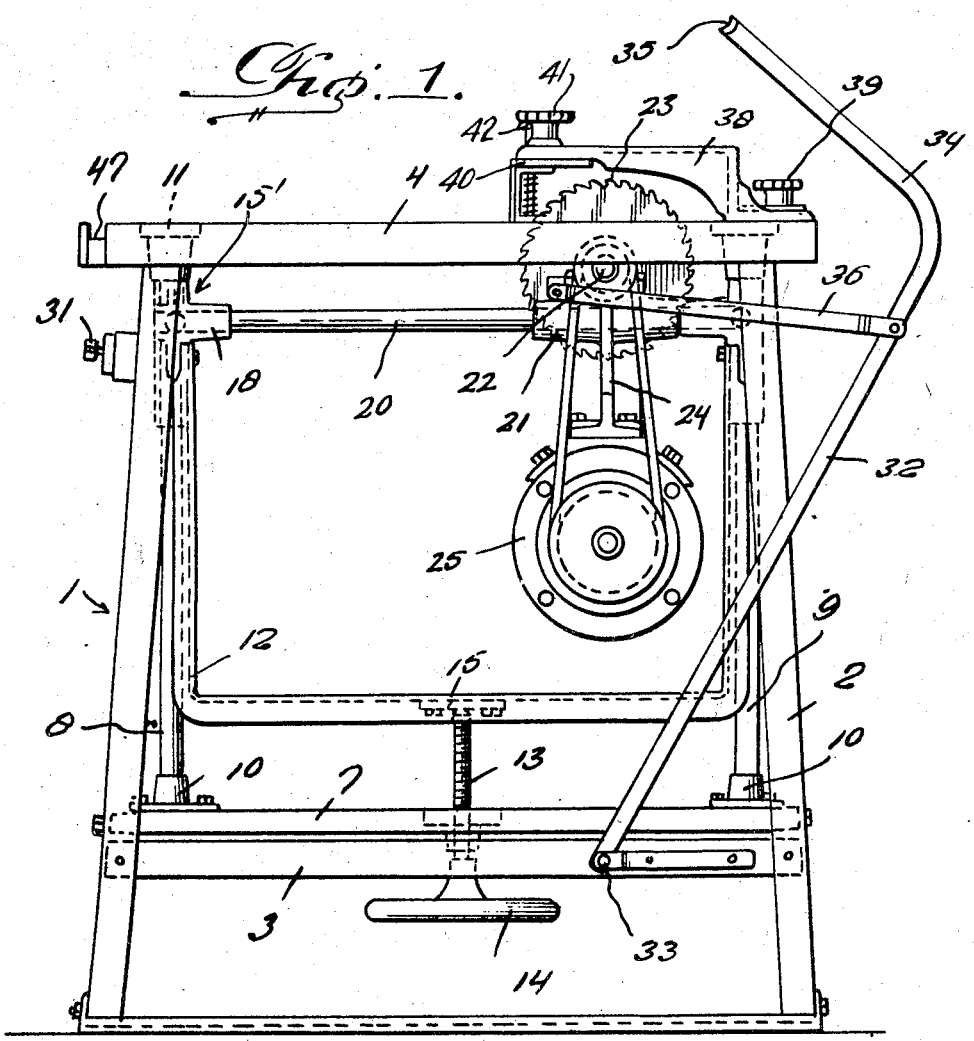
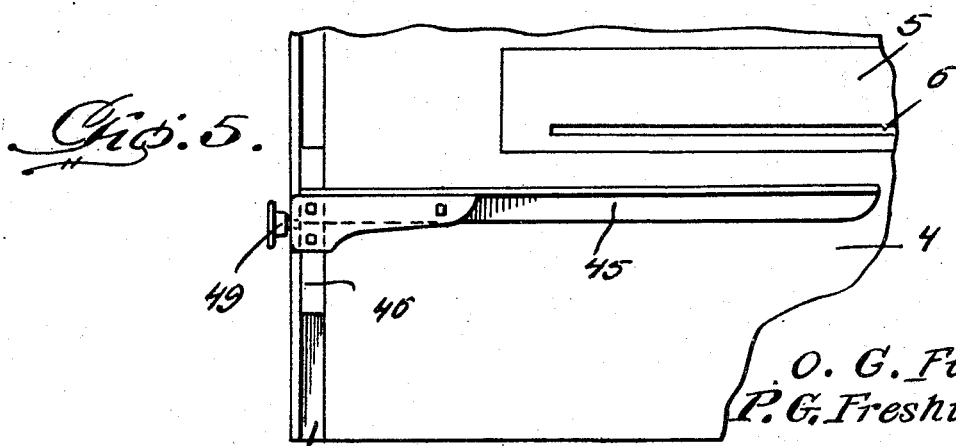
Inventors
O. G. Fishel,
P. G. Freshwater,
By Clarence A. O'Brien
Attorney

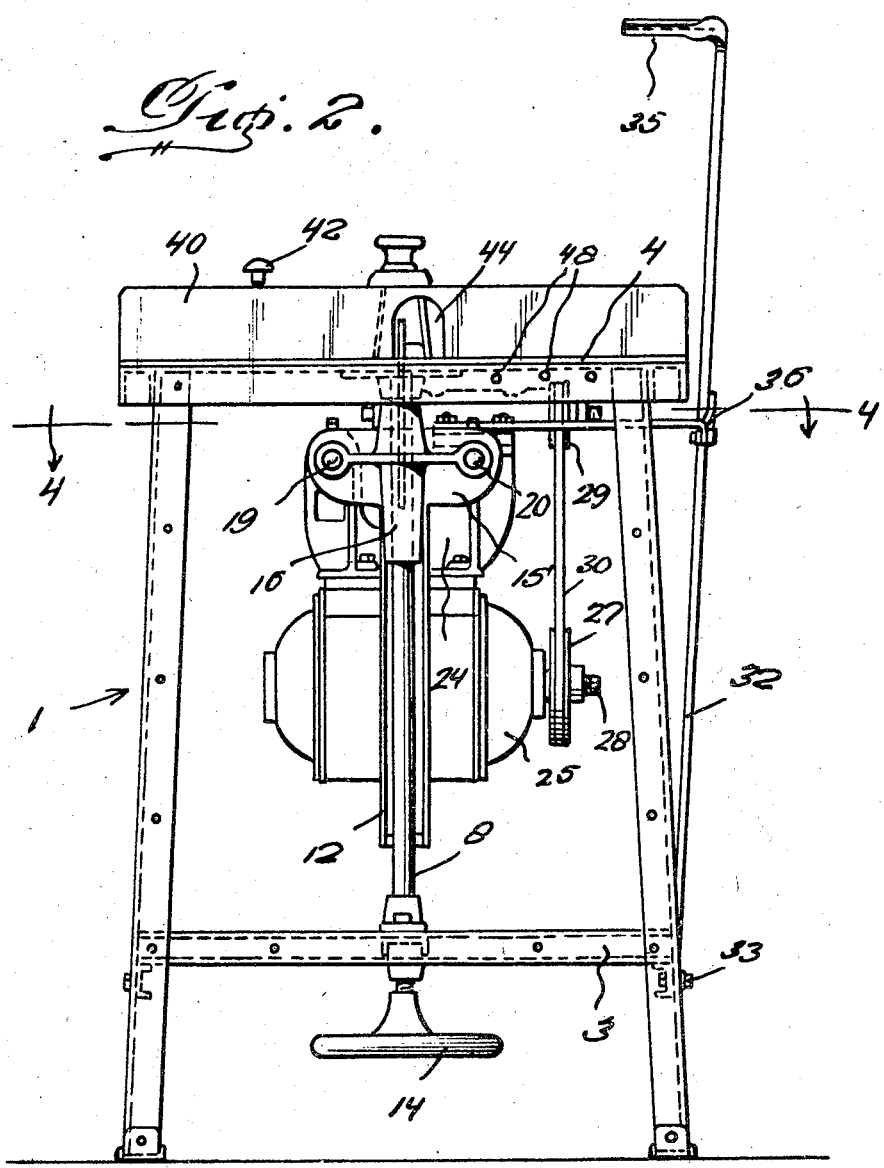

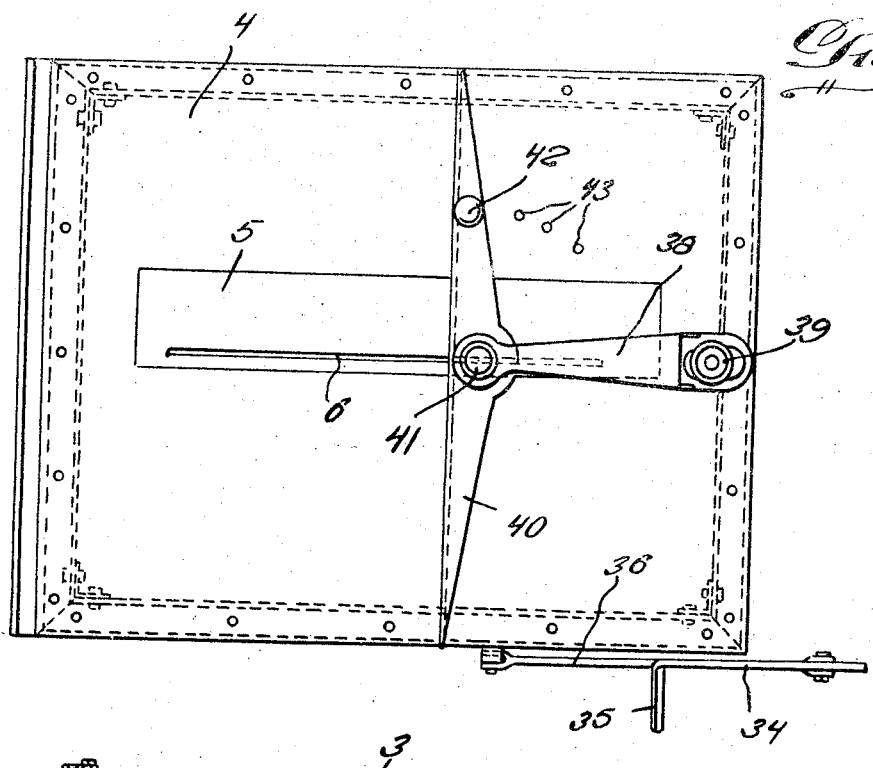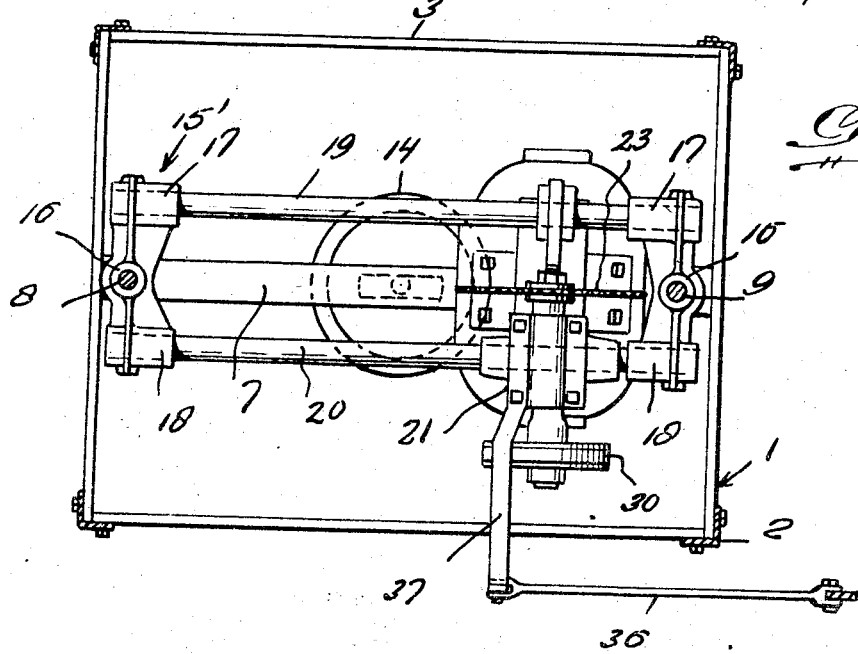

Patented Apr. 29, 1930

1,756,287

UNITED STATES PATENT OFFICE

PERRY G. FRESHWATER AND ORVILLE G. FISHEL, OF NEWTON, IOWA

WOOD-SAWING MACHINE

Application filed September 24, 1928. Serial No. 308,041.

The present invention relates to improvements in wood sawing machines and has for its principal object to provide a structure wherein the stock to be cut is placed on the table of the machine against a stop forming member, a movable saw carriage being mounted on the machine, under the table, said carriage including a means for actuating a rotary saw blade for cutting the stock, by moving the rotating saw blade through the stock rather than by moving the stock against the saw blade.

Another object is to provide a wood sawing machine wherein the saw carriage is mounted under a table on a unit capable of vertical adjustment, the table being provided with a guarded slot through which the circular saw blade is operable.

Still a further object is to provide a wood sawing machine designed as aforesaid that includes a means for ripping the stock as well as sawing the stock in a cross cut manner.

Still a further object is to provide a wood sawing machine of the above mentioned character which is simple in construction, inexpensive, strong and durable and further well adapted to the purpose for which it is designed.

Other objects and advantages will become apparent during the course of the following description.

In the accompanying drawing, forming a part of this specification, and in which like numerals indicate like parts throughout the same:

Figure 1 is a side elevation of the wood sawing machine embodying our invention, Figure 2 is a front end elevation, Figure 3 is a top plan view, Figure 4 is a transverse section taken approximately on the line 4—4 of Figure 2 looking downwardly, and Figure 5 is a fragmentary top plan view showing the guide that is employed when the machine is used in ripping the stock.

In the drawings, wherein for the purpose of illustration is shown a preferred embodiment of our invention, the numeral 1 designates generally the frame of the wood sawing machine, the same including the angle iron corner posts 2 that are connected together by appropriate brace bars 3 and a table top of substantially rectangular formation is secured in a horizontal manner on the upper ends of the corner post and this table top is denoted by the reference character 4.

The table top 4 is provided with a cut out portion for receiving the removable insert or throat portion 5 in which is formed the longitudinally extending slot 6 to accommodate the protruding portion of the circular saw blade in the manner to be presently described in detail.

A longitudinally extending beam 7 is connected at its respective end to the intermediate portions of the lower transverse braces that connect the respective forward and rear pairs of corner posts or legs. A pair of vertical guide rods 8 and 9 respectively are secured at their lower ends in suitable castings 10 that are in turn fixed to the cross beam 7 inwardly of the ends thereof.

Similar castings 11 connect the upper ends of the guide rods to the under side of the table top 4 in the manner as more clearly illustrated in Figure 1 and the purpose of these guide rods will also be presently described.

Forming a salient part of the present invention is a substantially U-shaped unit 12 constructed of channel iron and the arms of this U-shaped unit embrace the inner portions of the respective stationary guide rods as suggested in Figure 1.

This U-shaped unit is adapted for vertical movement within the frame 1 and the actuating means for raising and lowering this unit consists of a vertically disposed screw shaft 13 that is threaded through the intermediate portion of the beam 7.

A hand wheel 14 is carried by the lower end of the screw shaft 13 while the upper end bears against a bearing block 15 secured to the intermediate portion of the crown or base of this U-shaped unit and this feature is also clearly illustrated in Figure 1 of the drawing.

A casting designated by the character 15' is associated with the upper free end of each of the arms of the U-shaped unit 12 and each casting includes a vertically disposed sleeve 16 that is slidable upon the respective guide rods and the sleeve is fixedly attached to the upper end of each arm of the U-shaped unit.

Each casting 15' further includes the horizontally disposed sleeves 17 and 18 respectively and these sleeves are arranged adjacent the upper end portion of the vertical sleeves 16 and on opposite sides thereof as shown in Figure 4.

A pair of parallel spaced rods 19 and 20 have their ends secured within the alined horizontally disposed sleeves of the castings arranged on the upper ends of the arms of the U-shaped unit 12 so that these rods extend longitudinally of the frame 1 and the rods will also be adapted for movement simultaneously with the vertical adjustment of the U-shaped units.

Any appropriate means may be provided for securing the ends of the longitudinally disposed rods 19 and 20 in the respective horizontal planes of the castings 15'.

A saw carriage 21 is arranged for slidable movement along the rods 19 and 20 and included in this saw carriage is the transversely disposed mandrel or shaft 22 on which is secured for rotation therewith the circular saw blade 23.

The circular saw blade is operable between the spaced rods 19 and 20 and is furthermore adapted to have a portion thereof protrude through the slot 6 formed in the insert or throat 5 arranged in the table top 4.

A motor supporting bracket 24 depends from the carriage 21 and the electric motor 25 is attached to the bracket by appropriate fastening means.

A pulley 27 is secured on the outer end of the drive shaft 28 of the electric motor 25 and is in alinement with the similar pulley 29 secured on the outer end of the driven or saw blade supporting shaft 22. A belt 30 is trained over the alined pulleys 27 and 29 whereby the saw carrying shaft will be operated when the current to the motor 25 is turned on and a switch for controlling the actuation of the motor is located at the front of the machine as at 31. The current for actuating the motor may be supplied from any suitable source as shown.

The means for actuating the carriage 21 to move the saw 23 through the stock placed on the table 4 comprises a vertically disposed lever 32 that is pivotally connected at its lower end to the side of the rear portion of the frame as at 33 and the upper end of the lever terminates in a laterally disposed arm 34 the free end of which terminates in the right angular disposed handle grip 35 as clearly illustrated in Figures 1 and 2 of the drawings.

This lever 32 is operatively connected to the movable saw carriage 21 by means of the link forming bar 36. The rear end of the link is pivotally connected to the lever 32 at a point below the laterally disposed arm portion 34 while the forward end of this link is pivotally connected to the outer end of a transversely extending arm 37, the inner end of which is fixedly attached to the saw carriage 21 as shown in Figure 4.

A shield 38 is provided for the protruding portion of the circular saw blade 23 and this shield is secured at its rear end on the rear end portion of the table top 4 as at 39.

A stop abutment or stop member 40 of a length substantially equal to the width of the table top 4 is pivotally connected at its intermediate portion to the forward end of he shield 38 as at 41 by means of a small screw shaft carrying a small hand wheel on its upper end for disposition across the slotted insert 5 and this stop forming member may be disposed in any angularly adjusted position with respect to the slot by means of the spring pressed pin 42 that is disposed vertically through the stop member 40 and the recesses 43 formed in the upper face of the table top in a predetermined manner.

This means provides for the disposition of the stop member 40 either at a ninety degree, twenty two and one-half degree, thirty degree or forty five degree angle with respect to the slot 6 these being the commonly used angles; and by tightening the connection 41, the stop forming member may be secured in its adjusted position against accidental movement, or may be adjusted at any other desired angle with respect to the slot 6.

As is clearly shown in Figure 2, the vertically disposed stock engaging face of the stop member is formed with a cut out portion 44 to accommodate the circular saw blade when the carriage 21 is moved forwardly along the rods 19 and 20.

In operation, the piece of wood to be cut is placed on the table top 4 against the stop 40 which has been adjusted to the proper position after which the handle grip 35 is grasped and pulled forwardly so that the carriage 21 will move forwardly along the rods 19 and 20 and when the switch 31 is turned on, the circular saw blade 23 will be in operation and will saw through the wood in a cross cut manner.

For the purpose of ripping the stock, there is provided a longitudinally extending guide member 45 for rest upon the table top 4 adjacent the slotted insert 5 and a transversely disposed block 46 is carried by the forward end of the guide member for slidable movement within the transverse channel 47 formed at the forward end of the table top 4 and the outer side of this channel end of the table top is formed with a series of openings shown at 48 in Figure 2 to accommodate a thumb screw 49 which binds against the block 46 and secures the same in any adjusted position in said channel so that the guard 45 may be properly spaced with respect to the slot 6 depending upon the thickness of the strips to be cut.

It will thus be seen from the foregoing description, that we have provided a wood sawing machine that is simple in construction, yet efficient and reliable in its operation and a structure of this kind will not only be strong and durable but will save considerable time and labor.

Furthermore by arranging the parts in the manner shown and described, it is not necessary to feed the wood toward the saw but the wood is held in a stationary manner on the table top while the saw is drawn through the stock.

While we have shown the preferred embodiment of our invention it is to be understood that various changes in the size, shape and arrangement of parts may be resorted to without departing from the spirit of the invention and the scope of the appended claim.

While we have described our invention, what we claim as new is:

In combination, a wood sawing machine comprising a frame, a table top arranged thereon and provided with a longitudinal slot, stationary vertically disposed guides arranged in the frame, a unit arranged for vertical adjustment within the frame between the guides, castings carried by the opposite ends of the vertically adjustable unit, each of said castings including a vertically disposed sleeve to accommodate the respective stationary vertical guides, and horizontally disposed sleeves on opposite sides of the vertical sleeve, longitudinally extending guide rods having their ends receivable in the respective horizontal sleeves, a saw carriage slidably mounted on said longitudinal guide rods of the vertically adjustable units, a circular saw blade mounted on the carriage, means for actuating the circular saw blade, said saw blade adapted to protrude through the slot in the table top, and means for moving the carriage along the longitudinally disposed guide rod to force the circular saw blade through the stock placed on the table top across said slot.

In testimony whereof we affix our signatures.

PERRY G. FRESHWATER.
ORVILLE G. FISHEL.